United States Patent [19]

Chambers

[11] Patent Number: 4,747,229
[45] Date of Patent: May 31, 1988

[54] CRAWLING SLUG AND PEST EXTERMINATOR

[76] Inventor: Carl F. Chambers, Robinston, Me. 04671

[21] Appl. No.: 923,646

[22] Filed: Oct. 27, 1986

[51] Int. Cl.⁴ .............................................. A01M 1/22
[52] U.S. Cl. ...................................................... 43/112
[58] Field of Search .......................................... 43/112

[56] References Cited

U.S. PATENT DOCUMENTS

| | | | |
|---|---|---|---|
| 1,165,485 | 12/1915 | Adams | 43/112 |
| 1,326,320 | 12/1919 | Black | 43/112 |
| 1,422,287 | 7/1922 | Marchand | 43/112 |
| 1,953,622 | 4/1934 | Marsel | |
| 1,966,999 | 7/1934 | Sykes | |
| 1,972,180 | 9/1934 | Bowman | |
| 2,187,928 | 1/1940 | Barcroft | 43/112 |
| 2,188,618 | 1/1940 | Zalesky | |
| 2,244,191 | 6/1941 | Evans | 43/112 |
| 4,037,351 | 7/1977 | Springer | |
| 4,074,456 | 2/1978 | Tidwell | |
| 4,144,668 | 3/1979 | Darncharnjitt | |
| 4,241,532 | 12/1980 | Fancy | |
| 4,300,306 | 11/1981 | Hudgin | |

Primary Examiner—M. Jordan
Attorney, Agent, or Firm—Daniel H. Kane, Jr.

[57] ABSTRACT

A portable, battery powered elongate strip is provided for deployment at the boundary of an area to be protected from crawling slugs and pests. The strip is formed by an elongate base of dielectric insulating material for placement on the ground or other boundary surface. Electrical conductors are mounted in parallel spaced apart relationship on the base in the elongate direction. The upper surfaces of the conductors are exposed for contacting a crawling slug or pest passing over the strip. Odd number conductors are electrically connected together through a first coupling and even number conductors are electrically connected together through a second coupling to provide parallel open circuits which are closed by crawling slugs or pests passing over the strip. The end of the strip is secured to a reel hub which rotates within a portable reel and reel housing for storage of the strip in rolled up position in multiple turns around the reel hub inside the reel housing. The strip is deployed by pulling and unrolling the elongate strip from the reel housing and hub. A battery is mounted on the reel hub coupled to the conductors of the strip through the electrical couplings so that all elements of the open circuits move together.

20 Claims, 3 Drawing Sheets

CRAWLING SLUG AND PEST EXTERMINATOR

TECHNICAL FIELD

This invention relates to a new crawling slug and pest exterminating device that electrocutes or electrically disintegrates crawling slugs and pests attempting to enter a protected area.

BACKGROUND ART

Electrical insect exterminating devices using a grid or screen of electrically conducting lines of opposite polarity are described for example in the Marsel U.S. Pat. No. 1,953,622; the Zalesky U.S. Pat. No. 2,188,618; the Sykes U.S. Pat. No. 1,966,999; the Bowman U.S. Pat. No. 1,972,180; the Springer U.S. Pat. No. 4,037,351; and the Hudgin U.S. Pat. No. 4,300,306. An insect entering or encountering the grid or screen is electrocuted. These devices, however, are designed for application to flying insects and furthermore are generally operated using standard AC line voltage or greater voltage.

An example of the now familiar hanging lantern or light source and grid type device for electrocuting flying insects is described in the DeYoreo U.S. Pat. No. 4,523,404. These hanging light source and grid devices are operated by conventional AC power line voltage sources. Another flying insect electrocuting screen or grid for permanent installation for example between farm building rafters or wall posts is described in the Partridge U.S. Pat. No. 2,912,787.

For crawling pests the prior art references generally describe a variety of traps designed for particular applications such as rodents, for example, as set forth in the Tidwell U.S. Pat. No. 4,074,456: worms, for example, as set forth in the Fancy U.S. Pat. No. 4,241,532; and cockroaches, for example, as set forth in the Darncharnjitt U.S. Pat. No. 4,144,668. A disadvantage of these trap devices is the complexity of mechanical and electrical structure.

A further disadvantage of the prior art electrical exterminating devices and traps is that they are not well adapted for guarding an area to be protected from crawling slugs and pests, such as a garden or bed of plants. The disclosed structures cannot provide continuous protection along the boundary of such an area.

OBJECTS OF THE INVENTION

It is therefore an object of the present invention to provide a new electrically operated exterminating device for guarding or securing an area such as a garden or plant bed to be protected from crawling slugs and pests.

Another object of the invention is to provide a crawling slug and bug exterminator which provides continuous protection along a boundary area for excluding crawling pests such as slugs, snails, centipedes, earwigs, sow bugs, roaches, etc.

A further object of the invention is to provide a portable boundary-guarding and boundary-securing electrically operated crawling slug and pest exterminator which can be easily carried, deployed, and retrieved.

DISCLOSURE OF THE INVENTION

In order to accomplish these results the present invention provides a crawling slug and pest exterminator in the form of an elongate strip or strap for deployment along the boundary of an area to be protected. The elongate strip comprises an elongate base of dielectric insulating material such as a flexible belt or band of plastic for placement on the ground or other boundary surface, with a plurality of elongate electrical conductors or wires mounted in parallel spaced apart relationship along the top of the insulating base. The conductors or wires are exposed over their upper surfaces for contacting a crawling slug or pest passing over the strip. The conductors may be spaced apart in parallel a distance less than the average length of the target pests or slugs to be exterminated.

The odd number parallel conductors of the strip, that is, every other conductor beginning with the first one, are electrically connected together with a first electrical coupling to the ground voltage side or negative side of a battery or other portable DC voltage source. The even number parallel conductors, that is, every other conductor beginning with the second one, are electrically connected together with a second electrical coupling to the high voltage side or positive side of the battery or other portable DC voltage source. The odd and even conductors and the first and second electrical couplings thereby form parallel open circuits which are closed by crawling slugs or pests seeking to pass over the strip when the strip is deployed at the boundary of an area to be protected.

In the preferred example embodiment, the parallel spaced apart conductors are odd in number so that the outer conductors are coupled at ground voltage and the first high voltage conductors or positive voltage conductors are inside the ground voltage conductors. A feature and advantage of this arrangement is that crawling slugs or pests lie fully across a ground voltage conductor before contacting a high voltage conductor. A solid circuit is thereby established through the body of the slug. In a typical example five parallel conductors have been found to operate satisfactorily and nine volts from a portable DC battery such as a nine volt radio battery have been found sufficient to electrically dissociate or disintegrate the body structure of pests such as slugs. The conductors may be provided for example by single wires or wire pairs, exposed over the upper surface, by printed circuit conducting leads or strips, etc.

According to a preferred example of the portable exterminator, the flexible elongate strip is housed in a portable reel composed of a stationary reel housing with a carrying handle and a reel hub rotatably mounted in the reel housing with a crank handle for turning the reel hub relative to the reel housing. The flexible elongate strip or strap is secured at one end of the strip on the reel hub for storage in rolled up position in multiple turns around the reel hub inside the reel housing and for deployment in flat elongate position by pulling and unrolling the elongate strip from the reel housing and reel hub. In a typical example the strip may have a length of, for example, at least 50 feet (15 meters) using relatively low resistance copper wires such as, for example, No. 18 or larger diameter gauge wires mounted on a band of plastic, for example 2"-4" (5-10 cm) in width.

For the DC voltage source one or more batteries such as the standard nine volt batteries are mounted on the reel hub for rotating with the reel hub. The electrical couplings between the battery and wires are also mounted on the reel hub so that all electrical elements of the open circuits are mounted for movement together on the reel hub without the necessity of moving contacts.

The invention contemplates a number of other features in association with the reel-mounted strip including a grasping handle at the end of the strip for pulling the strip from the reel. Pegs with insulated arms are also provided in association with the reel for staking a strip into the ground along a boundary area. An elongate housing may be provided for receiving and protecting the deployed exterminating strip from weather and moisture, forming a cover portion over the conductors with elongate side openings for passage of crawling slugs over the strip under the housing cover. Other objects, features, and advantages of the invention are set forth in the following specification and accompanying drawings.

DESCRIPTION OF PREFERRED EXAMPLE EMBODIMENTS AND BEST MODE OF THE INVENTION

Figure 1:
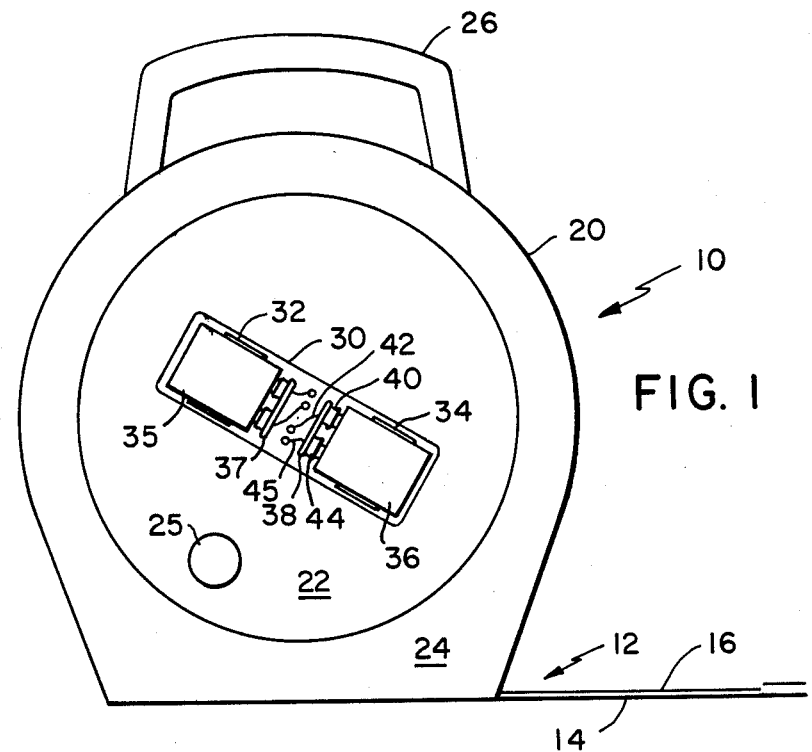
FIG. 1 is a plan view from the side of the portable reel-mounted electrical crawling slug and pest exterminating strip device.
Figure 2:
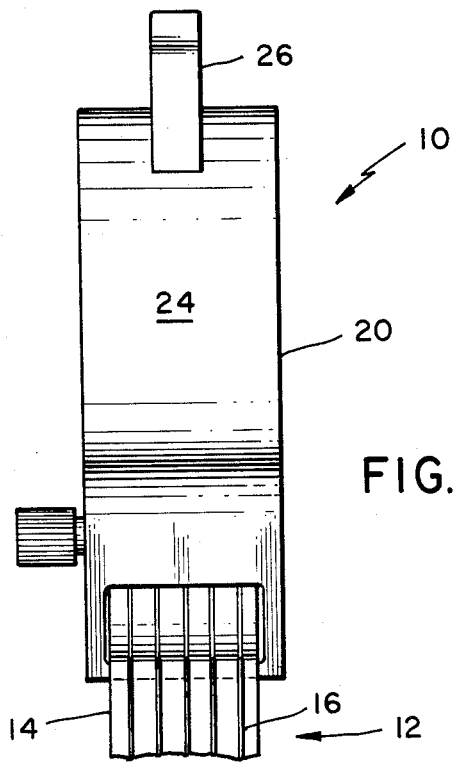
FIG. 2 is a front view of the portable reel-mounted exterminator strip device.

A portable exterminator 10 according to the present invention is illustrated in FIG. 1. The elongate strip 12 is formed by an elongate ribbon band or belt providing a plastic base 14 with a thickened end or grasping handle 15. Five parallel wires 16 are secured to the insulating plastic ribbon base 14 in spaced apart relationship with the upper surfaces of the wires 16 exposed for contacting a slug or other crawling pest passing over the strip 12.

The strip 12 is for example 50 feet (15 meters) in length and stored in a reel 20 in multiple turns around a rotatable reel hub 22 which rotates within the stationary housing 24 by turning or rotating the hub handle 25. The reel 20 is provided with a carrying handle 26 for convenient portability.

On the side of the rotatable reel hub 22 is a battery mounting bracket 30 with individual battery mounts or clips 32 and 34 in which are retained standard nine volt batteries 35 and 36 of the type used for example for portable radios and models. Electrical snap couplings 37 and 38 are provided on the battery mounting bracket 30 for coupling the respective batteries 35 and 36 to the conductor wires 16 of the strip 12. The electrical snap couplings 37 and 38 are coupled in parallel and may be used in the alternative so that when one battery is depleted the other is snapped into the circuit. Each snap coupling 38 includes a first electrical coupling 40 for example coupled to the ground side or negative side of the battery and through lead wire 42 to the odd number wires of the conductors 16 of strip 12. The second electrical coupling 44 is connected to the high voltage or positive side of the battery 36 and through line 45 to the even number wires of the conductors 16 of strip 12.

Figure 3:
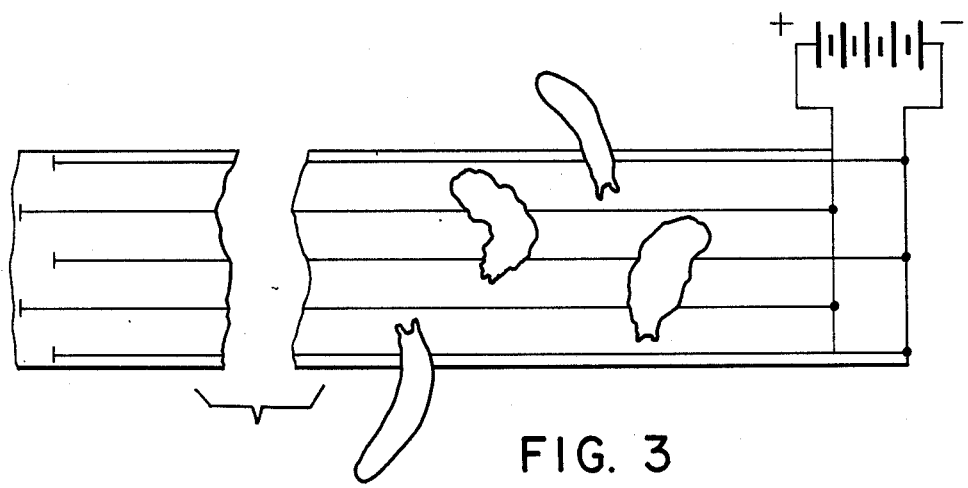
FIG. 3 is a fragmentary schematic circuit diagram showing the operation of the open circuits of the strip in exterminating crawling slugs.

The electrical coupling is shown in the equivalent diagram of FIG. 3. As there illustrated, for example, the ground side of negative terminal of battery 36 is coupled through bus 48 to the odd number conductors 51, 53, and 55. On the other hand, the positive terminal or high voltage side of battery 36 is connected through bus 50 to the even number conductors 52 and 54. In this schematic illustration the conductors 51–55 represent the five wires of the elongate strip 12 and for example comprise single copper wires.

Figure 4:
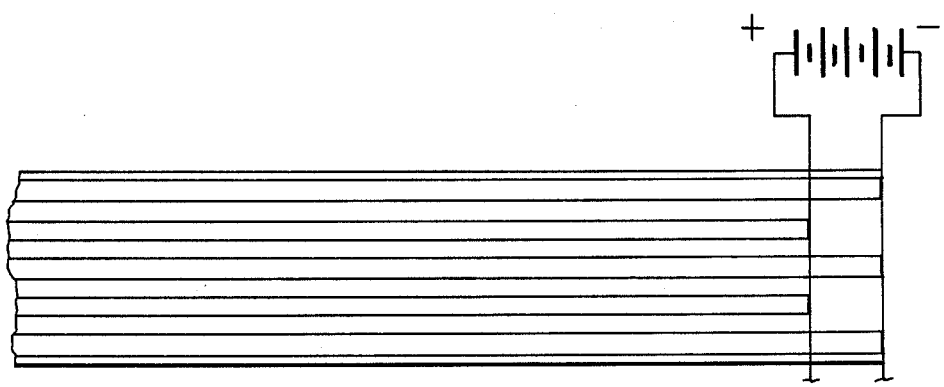
FIG. 4 is a fragmentary diagrammatic plan view of a portion of another strip using pairs of wires for the conductors on a flat flexible plastic insulating strip base.

In an alternative embodiment and example of FIG. 4 the odd number conductors 51a, 53a, and 55a, as well as the even number conductors 52a and 54a, comprise double wires in parallel relationship along the elongate strip 12a shown in fragmentary plan view. The double wire conductors of FIG. 4 are electrically coupled to the battery in the same manner as illustrated in FIG. 3.

As shown in FIG. 3, a slug or similar crawling pest or creature passes over the initial ground wire 55 and upon encountering the high voltage wire 54 completes a circuit which rapidly begins a process of electrical dissociation, disintegration, or decomposition of the slug to an inert mass. If the slug for some reason passes over the initial open circuit between conductors 54 and 55 it establishes another closed circuit between conductors 54 and 53, etc. It has been found that a sequence of five conductors of alternating polarity effectively prevents passage of crawling pests such as slugs with the application of electrical power from a simple nine volt DC battery.

Figure 5:
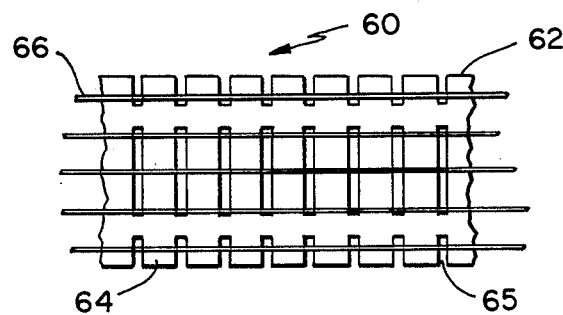
FIG. 5 is a fragmentary plan view of an alternative exterminator strip with the parallel conductors mounted on spaced apart dielectric cross pieces or ties flexibly articulated or coupled side by side to form the elongate base.

An alternative elongate base of dielectric material is shown in the fragmentary portion of elongate strip 60 of FIG. 5. In this example the elongate dielectric or insulating base 62 is composed of plastic cross pieces or ties 64 of dielectric plastic material flexibly articulated or coupled side by side by relatively flexible plastic couplings 65 to form the elongate base 62. The conductors or wires 66 are mounted in parallel spaced apart relationship along the insulating base 62 as heretofore described.

Figure 6:
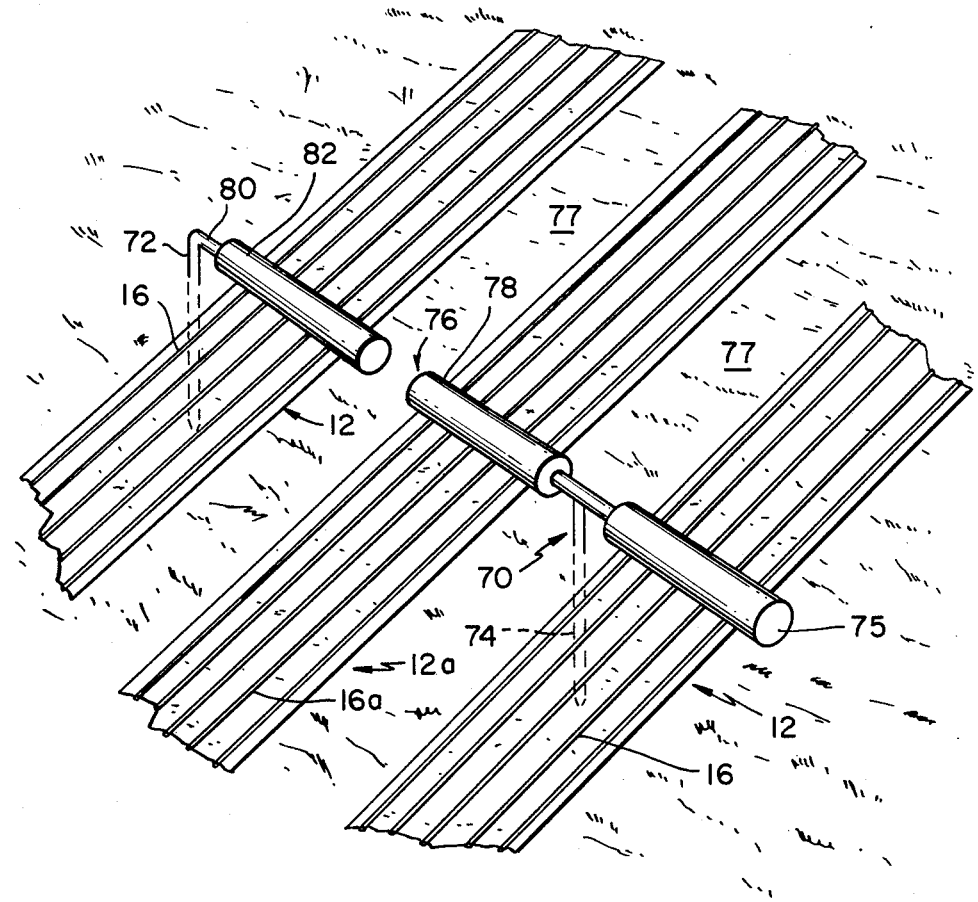
FIG. 6 is a perspective view of pegs with insulating arms according to the invention for staking and holding the strips in place on the ground.

The elongate strips 12 and 12a may be held in position or staked to the ground by means of pegs 70 and 72, as illustrated in FIG. 6. Peg 70 is formed with a post 74 for insertion in the ground and cross arms 75 and 76 formed with insulating sleeves or surfaces 77 and 78 respectively for bearing down on the elongate strips 12 and 12a holding them in place without shorting out the conductors 16 and 16a. In the example of peg 70, double exterminator strips are provided at the boundary for added protection. The peg 72 is formed with a single cross arm 80 covered with insulating sleeve or surface 82 to prevent shorting the conductors 16 of strip 12. The pegs 70 and 72 may be carried in a receptacle or holder secured to the reel housing.

Figure 7:
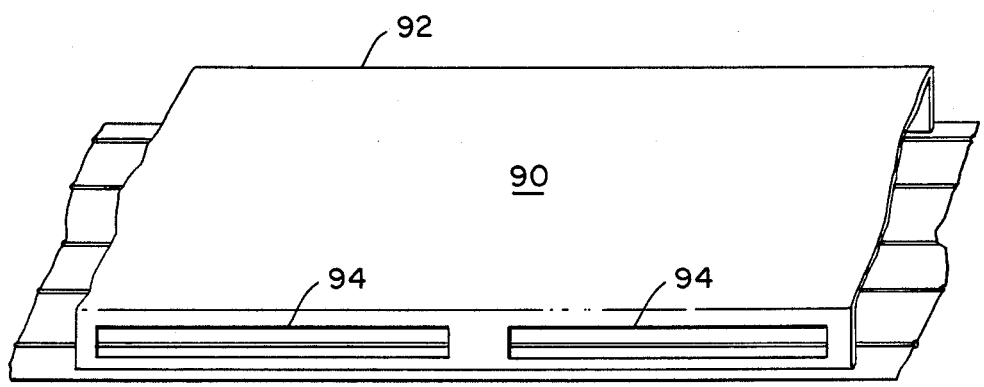
FIG. 7 is a side elevation view of an elongate housing for receiving and covering the elongate strip with crawlway openings on the side.

A further alternative feature of the invention is illustrated in FIG. 7 showing a fragmentary portion of an elongate housing 90 for receiving and housing the elongate strip 12. The housing 90 is formed with an overhead cover portion 92 which protects the exposed upper surfaces of conductors 16 on the elongate strip 12 from weather, moisture, and incidental materials that might fall on the elongate strip. The elongate housing 90 is also formed with elongate side openings or crawlways 94 for passage of crawling slugs or pests through the crawlways and over the elongate exterminator strip 12.

While the invention is described with reference to particular example embodiments, it is intended to cover all modifications and equivalents within the scope of the following claims.

I claim:

1. A crawling slug and pest exterminator comprising: an elongate strip for deployment at the boundary of an area to be protected, said strip comprising an elongate base of flexible dielectric insulating material suitable for rolling up the strip in a roll for storage and for unrolling the strip for placement on the ground or other boundary surface, a plurality of flexible electrical conductors mounted in parallel spaced apart relationship along the base, said conductors being exposed over the upper surface of the conductors for contacting a crawling slug or pest passing over the strip, said conductors being spaced apart a distance less than the average length of the target slugs or pests to be exterminated, the odd number conductors being electrically connected with first coupling means for coupling to the ground voltage side of a battery or portable DC voltage source, the even number conductors being electrically connected with second coupling means for coupling to the high voltage side of the battery or portable DC voltage source, said odd and even conductors and first and second coupling means thereby forming parallel open circuits closed by crawling slugs or pests passing over the strip when the strip is unrolled and deployed at the boundary of an area to be protected.

2. The exterminator of claim 1 wherein the parallel spaced apart conductors are odd in total number so that the outer conductors are coupled at ground voltage and the high voltage conductors are inside the ground voltage conductors on each side so that a crawling slug or pest lies across a ground voltage conductor before contacting a high voltage conductor.

3. The exterminator of claim 2 comprising at least five spaced apart parallel conductors.

4. The exterminator of claim 1 further comprising at least one battery or portable DC voltage source with a voltage of at least nine volts mounted for operative coupling of the positive side of the battery to the even number conductors and the negative side of the batttery to the odd number conductors.

5. The exterminator of claim 1 further comprising a portable reel means comprising a stationary reel housing and a reel hub rotatably mounted in the reel housing with a hub handle for turning the reel hub relative to the housing, said elongate strip being flexible and mountable at one end of the strip on the reel hub for storage in rolled up position in multiple turns around the reel hub inside the reel housing, and for deployment in flat elongate position by pulling and unrolling the elongate strip from the reel housing and reel hub.

6. The exterminator of claim 5 further comprising a set of pegs having at least one cross arm approximately the width of the strip with dielectric or insulating outer surfaces for holding the strip in place on the ground without short circuiting the conductors and open circuits.

7. The exterminator of claim 5 wherein the strip is at least 50 feet (15 meters) in length.

8. The exterminator of claim 5 wherein the reel hub comprises battery mounting means for mounting at least one battery on the reel hub for rotating with the reel hub, said first and second electrical coupling means also being mounted on the reel hub so that all electrical elements of the open circuits are mounted for movement together on the reel hub.

9. The exterminator of claim 8 further comprising at least one battery of at least nine volts mounted on the battery mounting means of the reel hub.

10. The exterminator of claim 8 wherein the free end of the elongate strip is formed with grasping means for grasping and pulling the end of the strip.

11. The exterminator of claim 10 wherein the grasping means comprises a thickened portion at the free end of the elongate base.

12. The exterminator of claim 1 wherein the elongate base comprises a flexible elongate flat strip of plastic.

13. The exterminator of claim 1 wherein the elongate base comprises spaced apart cross pieces or ties of dielectric material spaced apart and flexibly coupled side by side to form the elongate base.

14. The exterminator of claim 1 wherein each conductor comprises a pair of wires.

15. A crawling slug and pest exterminator comprising: an elongate strip for deployment at the boundary of an area to be protected, said strip comprising an elongate base of dielectric insulating material for placement on the ground or other boundary surface, said elongate base comprising a flexible elongate flat ribbon or and of plastic material suitable for rolling up the strip in a roll for storage and for unrolling the strip for deployment along a boundary;

said elongate strip further comprising a plurality of flexible electrical conductors mounted in parallel spaced apart relationship on the base in the elongate direction, said conductors being exposed over the upper surface of the conductors for contacting a crawling slug or pest passing over the strip, said conductors being spaced apart in parallel a distance less than the average length of the target slugs or pests to be exterminated;

the odd number conductors being electrically connected together with first coupling means for coupling to the ground voltage side or negative terminal of a battery or other portable DC voltage source, the even number conductors being electrically connected together with second coupling means for coupling to the high voltage side or positive voltage of the battery or portable DC voltage source;

said conductors comprising in total number an odd number of conductors so that the outer conductors along either side of the strip are coupled at ground voltage and the high voltage conductors are inside the ground voltage conductors and so that a crawling slug or pest lies across a ground voltage conductor before contacting a high voltage conductor when the strip is unrolled and deployed at the boundary of an area to be protected.

16. The exterminator of claim 15 further comprising an elongate housing for receiving and housing the elongate strip, said elongate housing formed with an overhead cover portion and elongate side openings for passage of crawling slugs or pests over the strip under the housing cover.

17. The exterminator of claim 15 wherein the plurality of conductors comprise at least five parallel spaced apart conductor wires, wherein the battery comprises at least one battery of voltage at least nine volts, and wherein the length of the strip is at least 50 feet (15 meters).

18. A crawling slug and pest exterminator comprising:

an elongate strip for deployment at the boundary of an area to be protected, said strip comprising an elongate flexible base of dielectric insulating material for placement on the ground or other boundary surface:

said elongate strip further comprising a plurality of electrical conductors mounted in parallel spaced apart relationship on the base in the elongate direction, said conductors being exposed over the upper surface of the conductors for contacting a crawling slug or pest passing over the strip, said conductors being spaced apart in parallel a distance less than the average length of the target slugs or pests to be exterminated:

the odd number conductors, namely every other conductor starting with the first conductor, being electrically connected together with first coupling means for coupling to the ground voltage side or negative voltage of a battery or portable DC voltage source, and every other conductor starting with the second conductor, being the even number conductors being electrically connected together with second coupling means for coupling to the high voltage side or positive side of a battery or portable DC voltage source, said odd and even wires and first and second coupling means thereby forming parallel open circuits closed by crawling slugs or pests passing over the strip when the strip is deployed at the boundary of an area to be protected;

said parallel spaced apart conductors comprising an odd total number of conductors so that the outer conductors are coupled at ground voltage and the high voltage conductors are inside the ground voltage conductors so that a crawling slug or pest lies across a ground voltage conductor before contacting a high voltage conductor:

portable reel means comprising a stationary reel housing and a reel hub rotatably mounted in the reel housing with a hub handle for turning the reel hub relative to the housing, said elongate strip being mountable at one end of the strip on the reel hub for storage in rolled up position in multiple turns around the reel hub inside the reel housing, and for deployment in flat elongate position by pulling and unrolling the elongate strip from the reel housing and reel hub;

said reel hub comprising battery mounting means for mounting at least one battery on the reel hub for rotating with the reel hub, said first and second electrical coupling means also being mounted on the reel hub so that all electrical elements of the open circuits are mounted for movement together on the reel hub.

19. The exterminator of claim 18 wherein the elongate base comprises a flexible elongate flat strip of plastic, wherein the free end of the strip is formed with grasping means for pulling the strip from the reel means, and wherein each conductor comprises at least one elongate wire mounted on the flexible elongate flat ribbon or strip of plastic.

20. The exterminator of claim 18 further comprising a set of pegs each having at least one cross arm approximately at least the width of the strip with dielectric or insulating outer surfaces for holding the strip in place on the ground without short circuiting the open circuits, said set of pegs being removeably coupled to the reel housing.

* * * * *